Aug. 5, 1958     KATSUMI NAKANO     2,846,274
TRESTLE LEGS
Filed Jan. 16, 1956     2 Sheets-Sheet 1
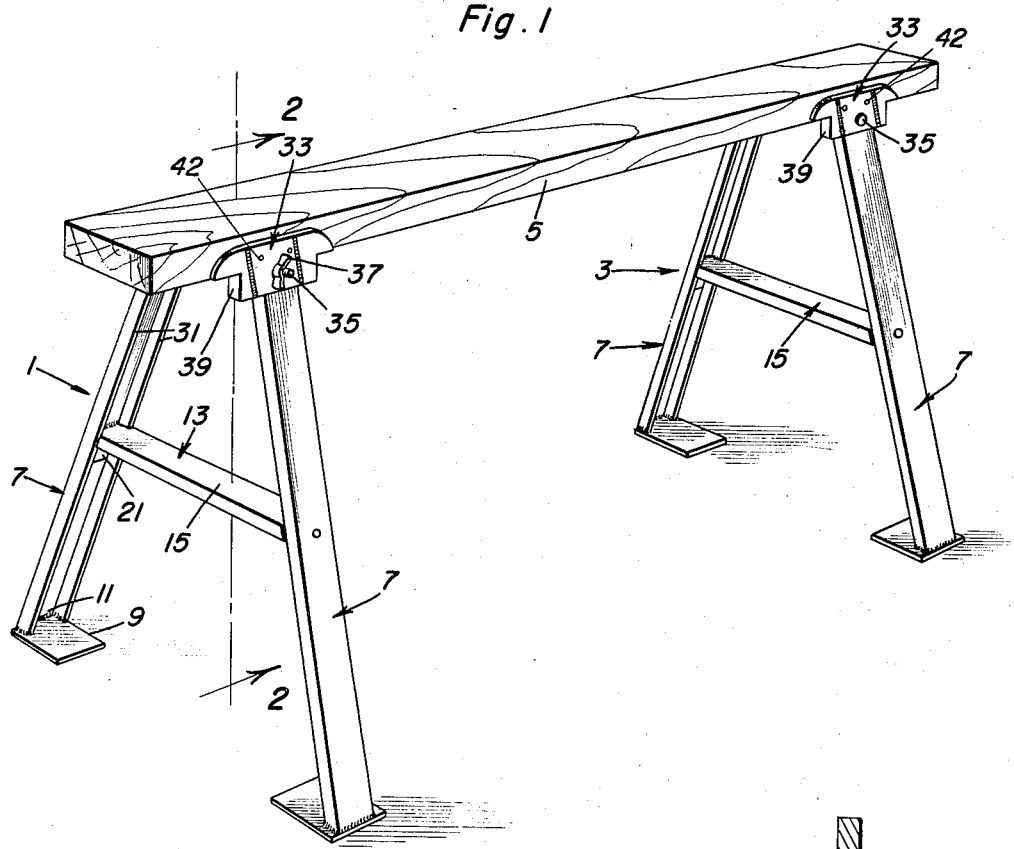
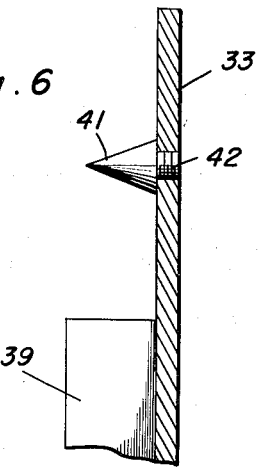
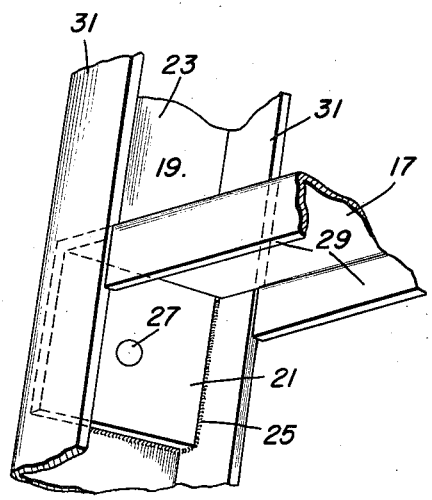
Katsumi Nakano
INVENTOR.

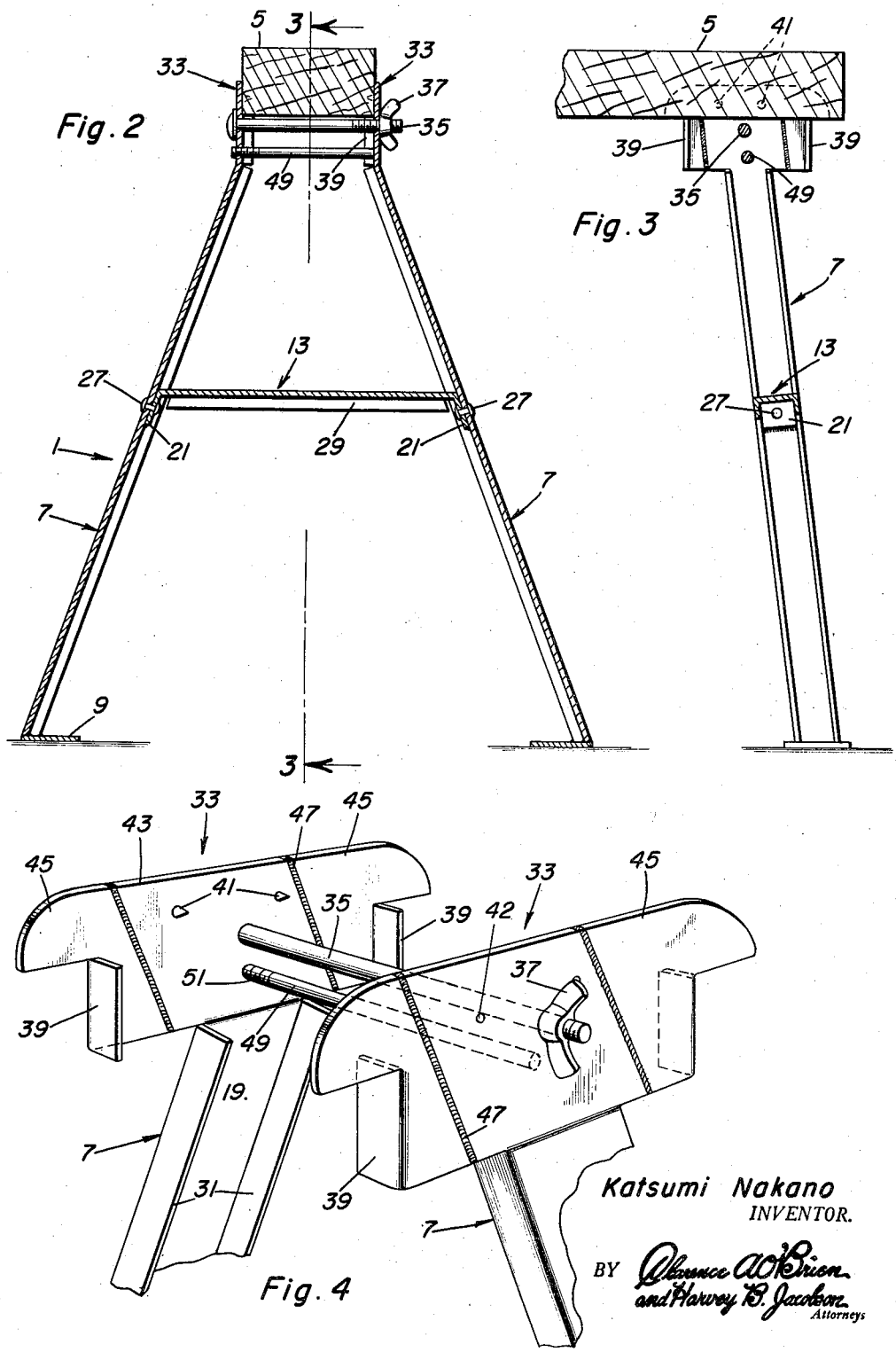

ured Aug. 5, 1958

2,846,274

TRESTLE LEGS

Katsumi Nakano, Honolulu, Territory of Hawaii

Application January 16, 1956, Serial No. 559,371

1 Claim. (Cl. 304—5)

My invention relates to improvements in legs for trestles of the type in which pairs of legs support a beam at the upper ends thereof for supporting scaffold boards or the like.

The primary object of my invention is to provide a pair of permanently connected together legs attachable, as a unit, to a wood plank, or beam, at selected points along the same without bolting to the plank, and so that as many pairs of legs may be attached to the plank, without weakening the same, as may be required with planks of different lengths to properly support the plank.

Another object is to provide a pair of legs for the above purposes which embody a pair of clamping plates, for engaging opposite sides of the plank, and a unitary cross connecting member spacing the legs apart at the approximate centers thereof and formed with ends permanently connected to the legs and sufficiently flexible to permit springing of the legs thereon to variably space the clamping plates apart for engaging the sides of planks of different widths.

Still another object is to provide clamping plates integrally joined to the legs, to obviate separate connections, and flexibly joined to said legs for flat engagement with the sides of planks of different widths.

Yet another object is to provide studs on the clamping plates for anchoring the same to the plank against slipping, and also to provide rests on said plates for supporting the plank while the plates are being clamped to the plank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in perspective of a trestle having legs constructed in accordance with my invention;

Figure 2 is an enlarged view in vertical transverse section taken on the line 2—2 of Figure 1;

Figure 3 is an enlarged fragmentary view in longitudinal section taken on the line 3—3 of Figure 2;

Figure 4 is an enlarged fragmentary view in perspective of the pair of legs detached;

Figure 5 is an enlarged fragmentary view in perspective of one of the legs and the cross connecting member; and Figure 6 is an enlarged fragmentary view in vertical section of one of the clamping plates with one of the anchoring studs thereon.

Referring by numerals to the drawings, wherein for the purpose of illustration two pairs 1, 3 of my improved legs have been shown as supporting the plank 5, the pairs of legs 1, 3 each comprising a pair of downwardly diverging channel leg bars 7 with channel sides facing and which are formed of any light strong metal slightly flexible inherently such as sheet steel or aluminum alloy.

Flat foot plates 9 are welded, as at 11, to the lower ends of the leg bars 7.

The cross connecting member, designated generally by the numeral 13, comprises a channel bar 15 with the channel facing downwardly and which is formed of the same material as the leg bars 7. The web 17 of the bar 15 at its ends extends into the channel 19 of the leg bars 7 and said ends are provided with downturned lips 21 secured to the webs 23 of the leg bars 7, in the approximate center of said bars 7, by welding 25 and also by a bolt 27. The lips 21 form flexible connections or joints between the bar 15 and leg bars 7 whereby the leg bars 7 may be sprung apart at their upper ends for a purpose presently explained. The flanges 29 of the bar 15 are slightly spaced from the flanges 31 of the leg bars 7 to facilitate springing movement of the leg bars 7.

A pair of opposite clamping plates 33 are provided on the upper ends of the leg bars 7 which are horizontally elongated and extend crosswise of said bars 7. A carriage bolt 35 extends through the clamping plates 33 below the plank 5 with a wing nut 37 threaded thereon and clampingly engages said plates 33 with opposite sides of the plank 5. The clamping plates 33 are each formed at lower corners thereof with a pair of inwardly projecting, rectangular lugs 39 bent out of the plate and forming rests on which the plank 5 seats. A pair of sharp pointed studs 41 are provided on each clamping plate 33 and which are spaced longitudinally thereof above the lugs 5 to bite into the plank 5 and anchor said plates to said plank 5 against slipping. Preferably the studs 41 are threaded, as at 42, into the clamping plates 33.

The clamping plates 33 are preferably formed by flattened out upper end extensions 43 of the leg bars 7 and wing plates 45 welded, as at 47, to the side edges of said extensions 43, and the extensions 43 form flexible connections or joints between said plates 33 and the leg bars 7 on which said plates 33 may be sprung apart to flatly engage opposite sides of planks 5 of different widths. As will be apparent, the leg bars 7 incline edgewise relative to the clamping plates 33 to incline downwardly longitudinally of the plank 5 in the usual manner.

A cross rod 49 extends between each pair of clamping plates 33 below the carriage bolt 35 and is threaded at one end, as at 51, into one of said plates for screw feed by manual turning of the same to thrust its other end against the other clamping plate 33 for a purpose presently explained.

In applying a pair of my improved legs, the leg bars 7 are sprung apart above the cross connecting member 13 to space the clamping plates 33 apart for receiving the plank 5 therebetween. This may be accomplished by turning the cross rod 49 to thrust the same against one clamping plate 33. The plank 5 is then inserted downwardly between said plates 33 to rest on the lugs 39. Then the carriage bolt 35 is tightened to clamp said plates 33 against opposite sides of the plank 5 and the cross rod 49 may then be turned to spring or flex said plates 33 into flat engagement with the sides of the plank. Obviously, the pairs of legs may be easily detached by loosening the carriage bolt 35 and springing the clamping plates 33 apart, also the upper ends of the leg bars 7, to withdraw the stud 41 and this may be accomplished by turning of the cross rod 39 to spread said plates apart.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A trestle comprising a plank, a pair of opposite channel bar legs having longitudinal side flanges and webs connecting the flanges and extending above the flanges obliquely of the webs and providing a pair of flexible clamping plates on said legs for receiving the plank therebetween, a pair of wing plates on opposite sides of the clamping plates for elongating the clamping plates, said wing plates having lower corners provided with inwardly projecting lugs thereon to form rests for said plank, means connecting said clamping plates together in clamping relation, and a thrust rod terminally threaded in one of the clamping plates for rotation to thrust its other end against the other clamping plate for flexing said plates to vary the oblique position thereof on said web.

References Cited in the file of this patent

UNITED STATES PATENTS

| Re. 23,097 | Imes | Apr. 12, 1949 |
| 381,510 | Rush | Apr. 17, 1888 |
| 604,387 | Gregory | May 24, 1898 |
| 933,650 | Kramer | Sept. 7, 1909 |
| 1,462,707 | Lawlor | July 24, 1923 |
| 1,530,965 | Wild | Mar. 24, 1925 |
| 1,542,367 | Bryan | June 16, 1925 |
| 1,685,668 | Davis | Sept. 25, 1928 |
| 1,936,196 | Kacena | Nov. 21, 1933 |
| 2,194,027 | McDonald | Mar. 19, 1940 |
| 2,198,956 | Thielepape | Apr. 30, 1940 |
| 2,634,172 | Hollidge | Apr. 7, 1953 |